N. H. ALBRECHT AND W. A. BALDWIN.
MOUSETRAP.
APPLICATION FILED JULY 13, 1920.
1,388,786. Patented Aug. 23, 1921.
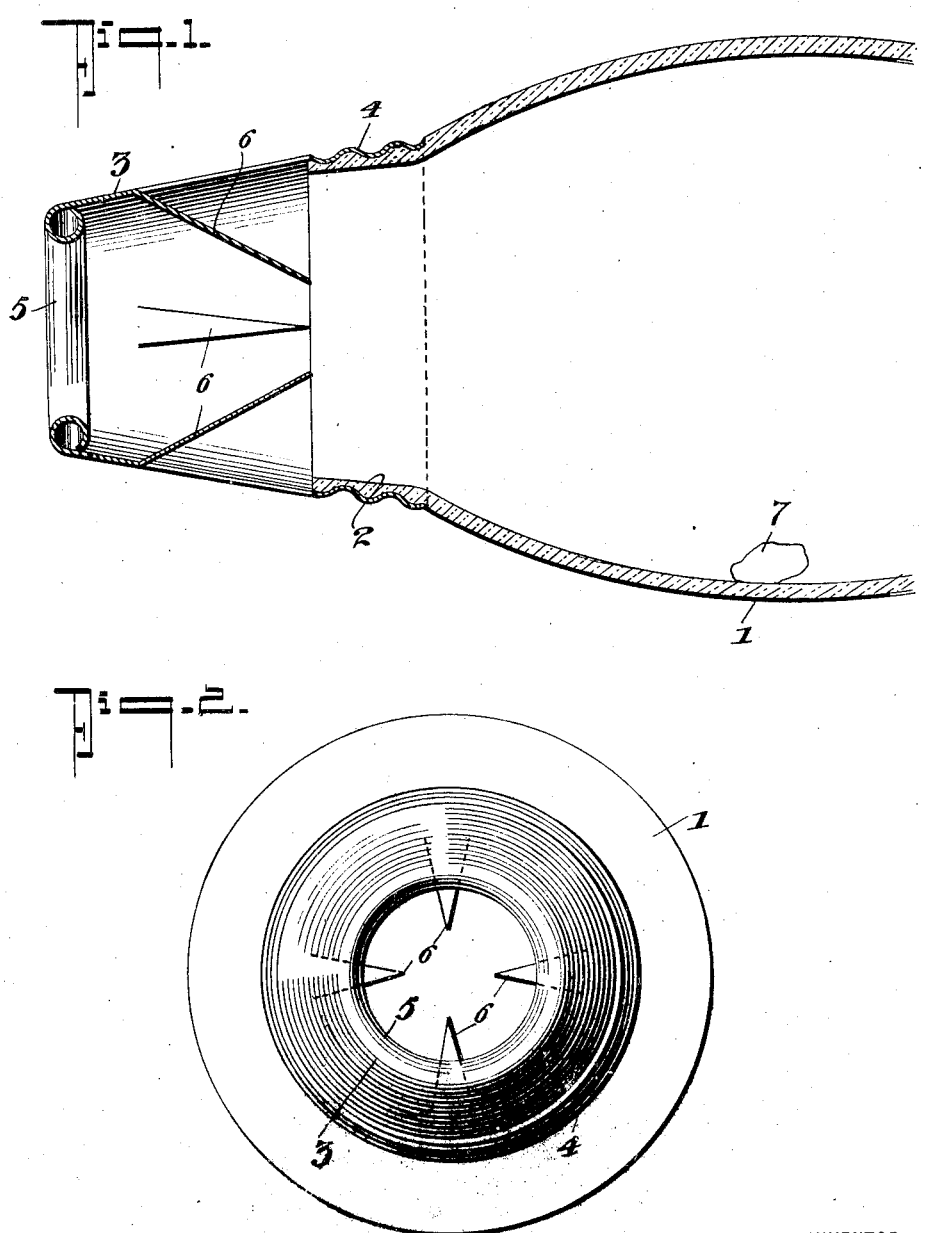

UNITED STATES PATENT OFFICE.

NUNNALLY H. ALBRECHT AND WALTER A. BALDWIN, OF DAWSON, GEORGIA.

MOUSETRAP.

1,388,786. Specification of Letters Patent. Patented Aug. 23, 1921.

Application filed July 13, 1920. Serial No. 395,852.

*To all whom it may concern:*

Be it known that we, NUNNALLY H. ALBRECHT and WALTER A. BALDWIN, both citizens of the United States, and residents of Dawson, in the county of Terrell and State of Georgia, have invented certain new and useful Improvements in Mousetraps, of which the following is a specification.

Our invention is an improvement in mouse traps, and has for its object to provide a trap in the form of a sleeve which may be connected with an ordinary fruit jar at one end, and wherein the sleeve has mechanism in connection therewith for permitting the free entrance of a mouse or rat to the jar, but for preventing the escape of the mouse or rat from the jar.

In the drawings:—

Figure 1 is a longitudinal section of the improved sleeve in place on a can,

Fig. 2 is a front view.

The present embodiment of the invention is shown in connection with a fruit jar 1 of any construction, having the neck 2 thereof provided with a coarse external thread, which in practice permits the engagement of the cover with the jar.

The improvement comprises a sleeve 3 of frusto-conical form having at the large end thereof a threaded portion 4 for engaging the neck 2 of the jar. At the small end the sleeve has an internal roll 5 for strengthening and reinforcing the same, and for providing a smooth surface at the said end and intermediate its ends the sleeve has struck-up spikes or spurs 6 on its inner surface.

These spurs or spikes are struck-up or formed from the material of the sleeve, the said material being slitted on two lines converging toward the large end of the sleeve, and the material between the slits is bent inward to form the tongues, spikes or spurs.

The free pointed ends of the spurs are spaced apart far enough from each other so that the rat or mouse can squeeze through without inconvenience, but cannot return without being caught by the points of the spurs. The jar with the sleeve connected is laid upon its side as shown, or it may be stood in vertical position if desired, and bait indicated at 7 is placed therein, the bait being of any suitable character, as for instance cheese or other material desired by such animals.

When the rat or mouse enters the jar after the bait, he cannot return. Other animals will be attracted by those in the jar, and when the jar is full it may be emptied by removing the cover.

We claim:—

1. A device of the character specified, comprising a frusto-conical sleeve having at the large end thereof a threaded portion for engaging the neck of a fruit jar, and having at the other an internal roll for strengthening the said end, said sleeve having internal pointed spurs converging toward the large end of the sleeve, said spurs being formed from the material of the sleeve.

2. A device of the character specified, comprising a frusto-conical sleeve having at the large end thereof a threaded portion for engaging the neck of a fruit jar, and having at the other an internal roll for strengthening the said end, said sleeve having internal pointed spurs converging toward the large end of the sleeve.

3. A device of the character specified, comprising a frusto-conical sleeve having at the large end thereof a threaded portion for engaging the neck of a fruit jar, said sleeve having struck-up internal pointed spurs converging toward the large end of the sleeve.

NUNNALLY H. ALBRECHT.
WALTER A. BALDWIN.